United States Patent Office 3,081,306
Patented Mar. 12, 1963

3,081,306
2,4-DIOXO-3-ARALKYLAZA - 9,10-DI(LOWER ALKOXY)-1,2,3,4,6,7-HEXAHYDRO - 11b - H - BENZOPYRIDOCOLINES
Joseph G. Lombardino, Brooklyn, and William M. McLamore, Kew Gardens, N.Y., and Gerald D. Laubach, Niantic, Conn., assignors to Chas. Pfizer & Co., Inc., New York, N.Y., a corporation of Delaware
No Drawing. Filed Nov. 4, 1959, Ser. No. 850,756
4 Claims. (Cl. 260—260)

This invention relates to new and useful heterocyclic compounds as well as to novel methods and intermediates for their preparation. More particularly, the present invention is concerned with novel organic nitrogen compounds which possess a unique heterocyclic ring system. There are also included within the scope of this invention various pharmaceutical compositions which have as their essential active ingredients at least one of the herein described compounds.

The compounds which are included within the purview of this invention are selected from the class of azabenzopyridocolines corresponding to the general structural formula:

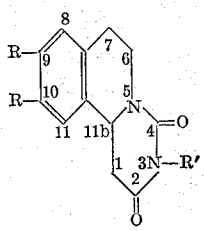

wherein each R is a member of the group consisting of hydrogen, hydroxy, lower alkoxy and alkyl, and when both R groups are taken together they form a methylenedioxy group, and R' is a member of the group consisting of hydrogen, lower alkenyl, alkyl, hydroxyalkyl, acyloxyalkyl, lower alkoxyalkyl, lower dialkylaminoalkyl, lower alkylmercaptoalkyl, aralkyl, aryl and aroylamino, said acyl moiety being derived from a hydrocarbon carboxylic acid having from two to eight carbon atoms in the skeletal structure and said alkyl moiety having from one to five carbon atoms. The system of nomenclature employed throughout this specification is that based on the Patterson system of nomenclature as is illustrated by the foregoing structural formula for a 2,4-dioxo-3-aza-1,2,3,4,6,7-hexahydro-11b-H-benzopyridocoline [e.g., see A .M. Patterson and L. T. Capell, The Ring Index, Reinhold Publishing Corp., New York (1940)].

In accordance with the present invention, the aforementioned azabenzopyridocoline derivatives have been found to possess interesting pharmaceutical properties which render them useful as synthetic medicinals. More particularly, these compounds have been shown to exhibit utility as transquilizing or hypotensive agents. Of especial value in this connection are those azabenzopyridocolines which have both a 9,10-dimethoxy grouping and a 3-substituent as previously defined on the ring nitrogen atom of the secondary amino group; typical 3-substituents include such groups as allyl, n-butyl, isoamyl, γ-hydroxypropyl, β-(3,4,5-trimethoxybenzoyloxy)ethyl, γ-dimethylaminopropyl, β-methylmercaptoethyl, p-chlorobenzyl and benzoylamino.

In accordance with the process for preparing the compounds of this invention, an appropriately substituted α - [1 - (2 - carbophenoxy - 1,2,3,4 - tetrahydroisoquinolyl)]acetamide is contacted in a reaction-inert organic solvent medium with a suitable condensing agent to form the desired 2,4-dioxo-3-aza-1,2,3,4,6,7-hexahydro-11b-H-benzopyridocoline as illustrated below by the following equation wherein R" is phenyl and R and R' are as previously defined except that the hydroxyl group of R and the hydroxyalkyl groups of R' must be protected, i.e., as alkoxy or acyloxy groups:

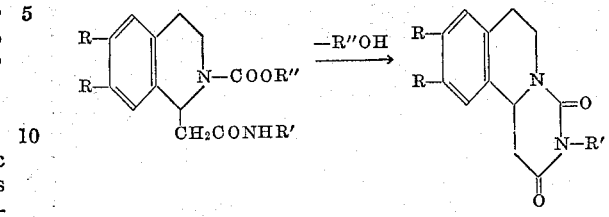

In this connection, it is to be understood that various other 2-carbaryloxy groups may be used in place of the 2-carbophenoxy group, such as 2-carbo(p-methylphenoxy), 2-carbo(p-chlorophenoxy), 2-carbo(p-nitrophenoxy, 2-carbo(α-naphthoxy), and the like. In general, the reaction is most desirably conducted at a temperature that is in the range of from about 50° C. to about 150° C. for a period of about one to about 24 hours. Preferred reaction-inert organic solvents in this connection include such aromatic hydrocarbons as benzene, toluene, xylene, and the like, as well as lower dialkyl ethers like diethyl ether, di-isopropyl ether, di-n-butyl ether, and so forth. In practice, it is most convenient to reflux a solution of the α-[1-(2-carbophenoxy-1,2,3,4-tetrahydroisoquinolyl)]-acetamide in one of the aforementioned solvents in the presence of the condensing agent which is ordinarily soluble in such a reaction mixture. Included among the various condensing agents suitable for such a purpose are alkali metals per se as well as their hydride, hydroxide, alcoholate, amide and organo derivatives, such as, for example, lithium hydride, sodium hydride, sodium ethylate, potassium t-butylate, sodamide, n-butyl lithium and phenyl lithium.

The starting materials employed in the process of this invention are all easily prepared in accordance with standard organic procedures previously described in the chemical literature. For instance, the aforementioned appropriately substituted α-[1-(2-carbophenoxy-1,2,3,4-tetrahydroisoquinolyl)]acetamide is conveniently synthesized from its corresponding 2-descarbophenoxy analog by treating the latter type compound with phenyl chloroformate in the presence of an acid-binding agent such as an inorganic base or an organic amine. Preferred acid-binding agents include sodium hydroxide, potassium carbonate, magnesium oxide, pyridine, picoline, lutidine, trimethylamine, triethylamine, tri-isopropylamine, etc. This reaction is ordinarily carried out in a reaction-inert polar organic solvent medium at a temperature that is in the range of from about 20 °C. to about 100° C. for about one to about 24 hours. Preferred reaction-inert polar organic solvents in this connection include lower dialkyl ethers such as di-ethyl ether, di-isopropyl ether, di-n-butyl ether, and the like; lower alkyl ketones such as acetone, methyl ethyl ketone, methyl isobutyl ketone, and the like; lower alkyl nitriles such as acetonitrile, propionitrile, and the like; N,N-lower dialkyl derivatives of lower alkane hydrocarbon carboxamides such as dimethylformamide, diethylformamide, dimethylacetamide, diethylacetamide, and the like; halogenated lower hydrocarbons such as methylene chloride, chloroform, ethylene dichloride, trichlorethylene, tetrachloroethane, and the like; and aromatic hydrocarbon solvents such as benzene, toluene, xylene, and the like.

The appropriately substituted α-[1-(1,2,3,4-tetrahydroisoquinolyl)]acetamides employed in the foregoing preparative step are readily synthesized from their corresponding 1-carbalkoxymethyl analogs via contact with an appropriately substituted primary amine. This particular reaction can be conducted at any temperature in the range of from about 20° C. to about 150° C. for from about two to about 48 hours. An excess of the amine reagent is preferably employed inasmuch as this also serves as a suitable solvent medium in which the reaction can take place. In practice, it is most convenient to reflux a solution of the appropriate 1-carboalkoxymethyl analog with an excess of the amine reagent as the solvent. The 1 - carboalkoxymethyl - 6,7 - disubstituted - 1,2,3,4 - tetrahydroisoquinoline so employed is readily obtainable by any number of known procedures disclosed in the prior art and preferably by the method described by J. M. Osbond [J. Chem. Soc. (London), 1951, p. 3646 and ibid., 1953, p. 2463], which involves reacting a 2-[3,4-di(substituted)phenyl]ethylamine with a carbalkoxyacetyl chloride, followed by a cyclization of the substituted malonamic ester so obtained and catalytic hydrogenation of the resulting cyclized product.

As previously indicated, the compounds of the present invention are readily used as transquilizing or hypotensive agents in addition to being useful as sedatives. Furthermore, the toxicity of these azabenzopyridocolines has been found to be quite low when they are administered to mice in amounts that are generally considered to be sufficient to achieve the desired effects as hereinafter indicated, while no other harmful pharmacological side effects have been observed to occur as a result of their administration. The aforementioned biological activity of the herein described compounds is well illustrated by means of standard pharmacological testing techniques devised for just such purposes; these tests have all been previously described in the literature and hence, they are well-known to those skilled in the art.

In accordance with a method of treatment of the present invention, the herein described azabenzopyridocoline derivatives can be administered to a subject via the oral or parenteral routes. In general, these compounds are most desirably administered in doses ranging from about 50 mg. to about 500 mg. per day, although variations will necessarily occur depending upon the weight of the subject being treated and the particular route of administration chosen. However, a dosage level that is in the range of from about 0.7 mg. to about 7.0 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of formulation chosen and the time period and interval at which such administration is carried out. In some instances, dosages below the lower limit of the aforesaid range may be more than adequate, while in other cases still larger dosages may be employed without causing any harmful or deleterious side effects, provided that such higher levels are first divided into several smaller doses that are to be administered throughout the day.

In connection with the use of the azabenzopyridocoline compounds of this invention for the treatment of agitated subjects, it is to be noted that they may be administered either alone or in combination with a pharmaceutically acceptable carrier by either of the routes previously indicated, and that such administration can be carried out in both single and multiple dosages. More particularly, the novel compounds of this invention can be administered in a wide variety of dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, the oral pharmaceutical compositions can be sweetened and/or flavored by means of various agents of the type commonly employed for such a purpose. In general, the therapeutically-active compounds of this invention are present in such dosage forms at concentration levels ranging from about 0.020% to about 90% by weight of the total composition, i.e., in amounts that are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate, citric acid and talc are often very useful for tabletting purposes. Solid compositions of a similar type may also be employed as fillers in soft and hard-shelled gelatin capsules; preferred materials in this connection also include lactose or milk sugar as well as high molecular weight polyethylene glycols. When aqueous suspensions and/or elixirs are desired for oral administration, the essential active ingredient may be combined with various sweetening and flavoring agents, coloring matter or dyes and, if so desired, emulsifying and/or suspending agents, together with such diluents as water, ethanol, propylene glycol, glycerin and various combinations thereof.

For purposes of intramuscular or subcutaneous administration, solutions of the azabenzopyridocoline bases in sesame or peanut oil or in aqueous-propylene glycol may be employed. These aqueous solutions are also suitable for intravenous injection purposes provided that their pH be properly adjusted beforehand and that such solutions be suitably buffered, if necessary, whereby the liquid diluent is rendered isotonic with sufficient saline or glucose. In this connection, the sterile aqueous media employed are readily obtained by standard techniques well-known to those in the art. For instance, when distilled water is ordinarily used as the liquid diluent the final preparation can be passed through a suitable bacterial filter such as a sintered glass filter or a diatomaceous earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary precautions should be taken during the preparation of these injectable solutions to assure that the products be obtained in a sterile condition.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

In a 250 ml. round-bottomed flask fitted with a reflux condenser and having a drying tube attached thereto, there were placed 14 g. (0.05 mole) of 1-carboethoxymethyl-6,7-dimethoxyisoquinoline. One hundred grams (1.37 mole) of n-butylamine were then rapidly added dropwise and the resulting solution was refluxed for 24 hours under a nitrogen atmosphere. At the end of this period, the reaction solution was concentrated under reduced pressure until crystallization commenced. The residual solid material isolated in this manner was taken up in 100 ml. of benzene, the resulting solution filtered and the filtrate so obtained was subsequently concentrated in vacuo to about one-half of its original volume. Cyclohexane was then added to this solution until incipient cloud formation occurred. Upon standing, a yellow-orange solid soon deposited from the cloudy solution and this material was subsequently isolated by means of filtration. The yield of product so obtained amounted to 7.25 g. (50%), and after one recrystallization from benzene-cyclohexane there were afforded light yellow crystals of pure N-(n-butyl)-α-[1-(6,7-dimethoxy - 1,2,3,4 - tetrahydroisoquinolyl)]acetamide, M.P. 87–88° C.

*Analysis.*—Calcd. for $C_{17}H_{26}O_3N_2$: C, 66.64; H, 8.55; N, 9.14. Found: C, 66.66; H, 8.55; N, 9.04.

*Example II*

The procedure described in Example I was followed except that 9.76 g. (0.035 mole) of 1-carboethoxymethyl-6,7-dimethoxyisoquinoline and 75 g. (1.0 mole) of isobutylamine were the reactants employed; in this particular case, there were obtained 5.8 g. (55%) of N-isobutyl-α-[1-(6,7-dimethoxy-1,2,3,4 - tetrahydroisoquinolyl)]acetamide, M.P. 105–108° C. In the same manner, 8.36 g. (0.03 mole) of 1-carboethoxymethyl-6,7-dimethoxy-1,2,3,4-tetrahydroisoquinoline and 100 g. (1.15 mole) of isoamylamine reacted to afford 6.8 g. (70%) of N-isoamyl-α-[1-(6,7-dimethoxy-1,2,3,4 - tetrahydroisoquinolyl)]acetamide, M.P. 74–76° C.; 6.96 g. (0.025 mole) of 1-carboethoxymethyl-6,7-dimethoxy - 1,2,3,4-tetrahydroisoquinoline and 37.8 g. (0.62 mole) of β-hydroxyethylamine reacted to afford N-(β-hydroxyethyl)-α-[1-(6,7-dimethoxy-1,2,3,4-tetrahydroisoquinolyl)]acetamide; 6.96 g. (0.025 mole) of 1-carboethoxymethyl-6,7-dimethoxy-1,2,3,4-tetrahydroisoquinoline and 47.0 g. (0.62 mole) of γ-hydroxypropylamine reacted to afford 6.8 g. (84%) of N-(γ-hydroxypropyl)-α-[1-(6,7-dimethoxy - 1,2,3,4-tetrahydroisoquinolyl)]acetamide, M.P. 115–119° C.; 6.96 g. (0.025 mole) of 1-carboethoxymethyl-6,7-dimethoxy-1,2,3,4-tetrahydroisoquinoline and 46.5 g. (0.62 mole) of β-methoxyethylamine reacted to afford N-(β-methoxyethyl)-α-[1-(6,7-dimethoxy-1,2,3,4-tetrahydroisoquinolyl)]acetamide; 6.96 g. (0.025 mole) of 1-carboethoxymethyl-6,7-dimethoxy-1,2,3,4-tetrahydroisoquinoline and 55.0 g. (0.62 mole) of γ-methoxypropylamine reacted to afford N-(γ-methoxypropyl)-α-[1-(6,7-dimethoxy - 1,2,3,4 - tetrahydroisoquinolyl)]acetamide; 6.96 g. (0.025 mole) of 1-carboethoxymethyl-6,7-dimethoxy - 1,2,3,4-tetrahydroisoquinoline and 73.0 g. (0.62 mole) of γ-isopropoxypropylamine reacted to afford N-(γ-isopropoxypropyl) - α - [1-(6,7-dimethoxy-1,2,3,4-tetrahydroisoquinolyl)]acetamide; 6.96 g. (0.025 mole) of 1-carboethoxymethyl-6,7-dimethoxy-1,2,3,4-tetrahydroisoquinoline and 35.0 g. (0.62 mole) of allylamine reacted to afford N-allyl-α-[1-(6,7-dimethoxy-1,2,3,4 - tetrahydroisoquinolyl)]acetamide; 6.96 g. (0.25 mole) of 1-carboethoxymethyl-6,7-dimethoxy-1,2,3,4-tetrahydroisoquinoline and 44.0 g. (0.62 mole) of β-methylallylamine reacted to afford N-(β-methylallyl)-α-[1-(6,7-dimethoxy-1,2,3,4-tetrahydroisoquinolyl)]acetamide; 6.96 g. (0.025 mole) of 1-carboethoxymethyl-6,7-dimethoxy-1,2,3,4-tetrahydroisoquinoline and 63.3 g. (0.62 mole) of β-diethylaminoethylamine reacted to afford N-(β-diethylaminoethyl)-α-[1-(6,7-dimethoxy - 1,2,3,4-tetrahydroisoquinolyl)]acetamide; 6.96 g. (0.025 mole) of 1-carboethoxymethyl-6,7-dimethoxy - 1,2,3,4-tetrahydroisoquinoline and 63.0 g. (0.62 mole) of γ-dimethylaminopropylamine reacted to afford N-(γ-dimethylaminopropyl)-α-[1-(6,7-dimethoxy-1,2,3,4-tetrahydroisoquinolyl)]acetamide; 6.96 g. (0.025 mole) of 1-carboethoxymethyl-6,7-dimethoxy-1,2,3,4-tetrahydroisoquinoline and 100 g. (0.93 mole) of benzylamine reacted to afford 7.6 g. (90%) of N-benzyl-α-[1-(6,7-dimethoxy-1,2,3,4 - tetrahydroisoquinolyl)]acetamide, M.P. 129.5–132.5° C.; 6.96 g. (0.025 mole) of 1-carboethoxymethyl-6,7-dimethoxy - 1,2,3,4-tetrahydroisoquinoline and 87.7 g. (0.62 mole) of p-chlorobenzylamine reacted to afford N-(p-chlorobenzyl) - α - [1-(6,7-dimethoxy - 1,2,3,4 - tetrahydroisoquinolyl)]acetamide; 6.96 g. (0.025 mole) of 1-carboethoxymethyl-6,7-dimethoxy-1,2,3,4-tetrahydroisoquinoline and 75.0 g. (0.62 mole) of β-phenylethylamine reacted to afford 8 g. (92%) of N-(β-phenylethyl)-α-[1-(6,7-dimethoxy - 1,2,3,4-tetrahydroisoquinolyl)]acetamide, M.P. 114–116° C.; 6.96 g. (0.025 mole) of 1-carboethoxymethyl-6,7-dimethoxy-1,2,3,4-tetrahydroisoquinoline and 114.7 g. (0.62 mole) of m-xylyl bromide reacted to afford N-(m-xylyl)-α-[1-(6,7-dimethoxy - 1,2,3,4 - tetrahydroisoquinolyl)]acetamide; 6.96 g. (0.025 mole) of 1-carboethoxymethyl-6,7-dimethoxy-1,2,3,4-tetrahydroisoquinoline and 146.9 g. (0.62 mole) of p-chlorobenzhydryl chloride reacted to afford N-(p-chlorobenzhydryl)-α-[1-(6,7-dimethoxy - 1,2,3,4-tetrahydroisoquinolyl)]acetamide; 6.4 g. (0.023 mole) of 1-carboethoxymethyl-6,7 - dimethoxy - 1,2,3,4 - tetrahydroisoquinoline and 8.15 g. (0.06 mole) of benzohydrazide reacted to afford a 78% yield of N-(benzoylamino)-α-[1-(6,7 - dimethoxy - 1,2,3,4 - tetrahydroisoquinolyl)]acetamide, M.P. 173.5–175.5° C.; 6.4 g. (0.023 mole) of 1-carboethoxymethyl-6,7-dimethoxy - 1,2,3,4 - tetrahydroisoquinoline and 10.21 g. (0.06 mole) of p-chlorobenzohydrazide reacted to afford N-(p-chlorobenzoylamino)-α-[1-(6,7-dimethoxy-1,2,3,4-tetrahydroisoquinolyl)]acetamide; 6.4 g. (0.023 mole) of 1-carboethoxymethyl-6,7-dimethoxy-1,2,3,4-tetrahydroisoquinoline and 9.95 g. (0.06 mole) of p-anisohydrazide reacted to afford N-(p-anisoylamino)-α-[1-(6,7-dimethoxy-1,2,3,4 - tetrahydroisoquinolyl)]acetamide; 6.4 g. (0.023 mole) of 1-carboethoxymethyl-6,7-dimethoxy - 1,2,3,4 - tetrahydroisoquinoline and 15.3 g. (0.06 mole) of β - (3,4,5 - trimethoxybenzoyloxy)ethylamine reacted to afford N-[β - (3,4,5 - trimethoxybenzoyloxy)-ethyl]-α-[1-(6,7-dimethoxy - 1,2,3,4 - tetrahydroisoquinolyl)]acetamide.

In like manner and employing appropriate molar amounts of reactants in each case, 1-carboethoxymethyl-6,7-dimethoxy-1,2,3,4-tetrahydroisoquinoline and ε-methylmercaptoamylamine react to afford N - (ε - methylmercaptoamyl)-α-[1-(6,7-dimethoxy - 1,2,3,4 - tetrahydroisoquinolyl)]acetamide; 1-carboethoxymethyl - 6,7 - dimethoxy-1,2,3,4 - tetrahydroisoquinoline and δ-ethylmercaptobutylamine react to afford N-(δ-ethylmercaptobutyl)-α-[1-(6,7-dimethoxy-1,2,3,4 - tetrahydroisoquinolyl)]acetamide; and 1-carboethoxymethyl - 6,7 - dimethoxy-1,2,3,4-tetrahydroisoquinoline and isopropylmercaptomethylamine react to afford N-(isopropylmercaptomethyl)-α-[1-(6,7-dimethoxy-1,2,3,4-tetrahydroisoquinolyl)]acetamide. Similarly, 1-carboethoxymethyl-6,7-diethoxy-1,2,3,4-tetrahydroisoquinoline reacts with n-propylamine to afford N-(n-propyl)-α-[1-(6,7-diethoxy - 1,2,3,4-tetrahydroisoquinolyl)]acetamide; 1-carboethoxymethyl - 6,7-methylenedioxy-1,2,3,4-tetrahydroisoquinoline reacts with ethylamine to afford N-ethyl-α-[1-(6,7-methylenedioxy - 1,2,3,4-tetrahydroisoquinolyl)]acetamide; 1-carboethoxymethyl - 6,7-di-n-butoxy - 1,2,3,4 - tetrahydroisoquinoline reacts with methylamine to afford N-methyl-α-[1-(6,7-di-n-butoxy-1,2,3,4 - tetrahydroisoquinolyl)]acetamide; 1-carboethoxymethyl-6,7-di-isoamyloxy - 1,2,3,4-tetrahydroisoquinoline reacts with β-methylmercaptoethylamine to afford N-(β-methylmercaptoethyl) - α - [1-(6,7-di-isoamyloxy-1,2,3,4-tetrahydroisoquinolyl)]acetamide; 1 - carboethoxymethyl-6,7-dihydroxy - 1,2,3,4-tetrahydroisoquinoline reacts with n-butylamine to afford N-(n-butyl)-α-[1-(6,7-dihydroxy-1,2,3,4-tetrahydroisoquinolyl)]acetamide; 1-carboethoxymethyl-6,7-dimethyl - 1,2,3,4-tetrahydroisoquinoline reacts with aniline to afford N-phenyl-α-[1-(6,7-dimethyl-1,2,3,4-tetrahydroisoquinolyl)]acetamide; 1-carboethoxymethyl-6,7-di-isoamyl - 1,2,3,4 - tetrahydroisoquinoline reacts with p-chloroaniline to afford N-(p-chlorophenyl)-α-[1-(6,7-di-isoamyl-1,2,3,4-tetrahydroisoquinolyl)]acetamide; 1-carboethoxymethyl-1,2,3,4-tetrahydroisoquinoline reacts with p-anisidine to afford N-(p-anisyl)-α-[1-(1,2,3,4-tetrahydroisoquinolyl)]acetamide; 1 - carboethoxymethyl-6-hydroxy-7-methyl - 1,2,3,4 - tetrahydroisoquinoline reacts with p-toluidine to afford N-(p-tolyl)-α-[1-(6-hydroxy-7-methyl-1,2,3,4-tetrahydroisoquinolyl)]acetamide; and 1-carboethoxymethyl - 6 - ethoxy-7-methoxy-1,2,3,4-tetrahydroisoquinoline reacts with n-butylamine to afford N-(n-butyl)-α-[1-(6-ethoxy-7-methoxy - 1,2,3,4 - tetrahydroisoquinolyl)]acetamide.

*Example III*

In a 500 ml. three-necked, round-bottomed flask equipped with a magnetic stirring apparatus and fitted with a gas inlet tube, a gas outlet extension and a reflux condenser to which a drying tube was attached, there were placed 200 ml. of methanol and the flask and contents were cooled to 0° C. by means of an ice bath. At this point ammonia gas was introduced into the methanol until the solvent medium became completely saturated (this required about 75 minutes). To the so saturated solution there were then added 8 g. (0.0284 mole) of 1-carbethoxymethyl-6,7-dimethoxy - 1,2,3,4-tetrahydroisoquinoline. After this addition was complete, stirring was continued for a period of about four hours while the temperature of the reaction mixture was maintained at 0° C. The resulting bright clear yellow solution was then allowed to attain room temperature and stirring was continued for an additional 48 hours. Upon completion of this step, the solvent was removed by means of evaporation under reduced pressure. The solid residual material so obtained was crystallized from aqueous ethanol to afford 3.55 g. (50%) of α-[1-(6,7-dimethoxy - 1,2,3,4-tetrahydroisoquinolyl)]-acetamide, M.P. 166–169.5° C.

*Example IV*

In a 50 ml. two-necked, round-bottomed flask equipped with a magnetic stirring apparatus and fitted with a dropping funnel and reflux condenser having a drying tube attached thereto, there were placed 0.50 g. (0.00148 mole) of N-benzyl-α-[1-(6,7-dimethoxy - 1,2,3,4 - tetrahydroisoquinolyl)]acetamide and 0.154 g. (0.00152 mole) of triethylamine in 20 ml. of dry chloroform (dried over calcium chloride). Stirring was commenced and the resulting pale yellow solution was cooled to 0° C. at which point there was slowly added from the dropping funnel a solution consisting of 0.236 g. (0.00152 mole) of phenyl chloroformate in 10 ml. of dry chloroform (this step required approximately 25 minutes). Upon completion of the addition step, the reaction mixture was stirred at 0° C. for one-half hour, then at room temperature for one hour and finally, refluxed for 30 minutes. After cooling to room temperature, it was washed with three successive 100 ml.-portions of water and subsequently dried over anhydrous sodium sulfate. The drying agent was then removed by means of filtration, and the dried filtrate was concentrated under reduced pressure to afford a residual oil that crystallized on cooling to yield 0.56 g. (82%) of N-benzyl-α-[1-(2-carbophenoxy - 6,7 - dimethoxy-1,2,3,4-tetrahydroisoquinolyl)]acetamide, M.P. 194.5–199° C.

*Example V*

The procedure described in Example IV is followed except that N-(p-chlorobenzyl) - α[1 - (6,7 - dimethoxy - 1,2,3,4-tetrahydroisoquinolyl)]acetamide is the starting material employed in lieu of the N-benzyl-α-[1-(6,7-dimethoxy-1,2,3,4-tetrahydroisoquinolyl)]acetamide of the previous example; in this particular case, the N-(p-chlorobenzyl) - α - [1 - (6,7 - dimethoxy - 1,2,3,4 - tetrahydroisoquinolyl)]acetamide reacts with phenyl chloroformate to afford N-(p-chlorobenzyl)-α-[1-(2-carbophenoxy-6,7-dimethoxy - 1,2,3,4 - tetrahydroisoquinolyl)]acetamide. When N-(β-phenylethyl - α - [1 - (6,7 - dimethoxy - 1,2,3,4-tetrahydroisoquinolyl)]acetamide and phenyl chloroformate react in accordance with this very same procedure, the corresponding product obtained is N-(β-phenylethyl)-α-[1 - (2 - carbophenoxy - 6,7 - dimethoxy - 1,2,3,4-tetrahydroisoquinolyl)]acetamide. In the same manner and employing appropriate molar amounts of reactants in each case, N-(m-xylyl)-α-[1-(6,7-dimethoxy-1,2,3,4-tetrahydroisoquinolyl)]acetamide is converted to N-(m-xylyl)-α-[1-(2 - carbophenoxy - 6,7 - dimethoxy - 1,2,3,4-tetrahydroisoquinolyl)]acetamide; N - (p - chlorobenzohydryl)-α-[1-(6,7 - dimethoxy - 1,2,3,4 - tetrahydroisoquinolyl)]acetamide is converted to N-(p-chlorobenzohydryl)-α-[1-(2-carbophenoxy-6,7-dimethoxy-1,2,3,4 - tetrahydroisoquinolyl)]acetamide; N-(n-butyl)-α-[1-(6,7-dimethoxy-1,2,3,4 - tetrahydroisoquinolyl)]acetamide is converted to N-(n-butyl)-α-[1 - (2 - carbophenoxy - 6,7 - dimethoxy-1,2,3,4 - tetrahydroisoquinolyl)]acetamide; N - isobutyl-α-[1-(6,7-dimethoxy - 1,2,3,4 - tetrahydroisoquinolyl)]acetamide is converted to N-isobutyl-α-[1-(2-carbophenoxy-6,7-dimethoxy-1,2,3,4 - tetrahydroisoquinolyl)]acetamide; N-isoamyl-α-[1-(6,7 - dimethoxy - 1,2,3,4 - tetrahydroisoquinolyl)]acetamide is converted to N-isoamyl-α-[1-(2-carbophenoxy-6,7-dimethoxy - 1,2,3,4 - tetrahydroisoquinolyl)]acetamide; N-(β-hydroxyethyl)-α-[1-(6,7 - dimethoxy-1,2,3,4-tetrahydroisoquinolyl)]acetamide is converted via its acetate to N-(β-hydroxyethyl)-α-[1-(2-carbophenoxy - 6,7 - dimethoxy - 1,2,3,4 - tetrahydroisoquinolyl)]acetamide; and N-(γ-hydroxypropyl) - α - [1-(6,7-dimethoxy-1,2,3,4-tetrahydroisoquinolyl)]acetamide is converted via its acetate to N-(γ-hydroxypropyl)-α-[1-(2-carbophenoxy-6,7-dimethoxy-1,2,3,4 - tetrahydroisoquinolyl)]acetamide.

In like manner and employing appropriate amounts of molar reactants in each case, N-(β-methoxyethyl)-α-[1 - (6,7 - dimethoxy - 1,2,3,4-tetrahydroisoquinolyl)] acetamide is converted to N-(β-methoxyethyl)-α-[1-(2-carbophenoxy-6,7-dimethoxy - 1,2,3,4 - tetrahydroisoquinolyl)]acetamide; N-(γ-methoxypropyl)-α-[1-(6,7-dimethoxy - 1,2,3,4 - tetrahydroisoquinolyl)]acetamide is converted to N-(γ-methoxypropyl) - α - [1-(2-carbophenoxy-6,7-dimethoxy-1,2,3,4 - tetrahydroisoquinolyl)]acetamide; N-(γ-isopropoxypropyl)-α-[1 - (6,7 - dimethoxy - 1,2,3,4-tetrahydroisoquinolyl)]acetamide is converted to N-(γ-isopropoxypropyl)-α-[1-(2 - carbophenoxy - 6,7 - dimethoxy-1,2,3,4-tetrahydroisoquinolyl)]acetamide; N-allyl-α-[1-(6,7 - dimethoxy - 1,2,3,4 - tetrahydroisoquinolyl)]acetamide is converted to N-allyl-α-[1-(2-carbophenoxy-6,7-dimethoxy - 1,2,3,4 - tetrahydroisoquinolyl)]acetamide; N-(β-methylallyl-α-[1-(6,7 - dimethoxy - 1,2,3,4 - tetrahydroisoquinolyl)]acetamide is converted to N-(β-methylallyl)-α-[1 - (2 - carbophenoxy - 6,7 - dimethoxy - 1,2,3,4-tetrahydroisoquinolyl)]acetamide; N - (β - diethylaminoethyl)-α-[1-(6,7 - dimethoxy - 1,2,3,4 - tetrahydroisoquinolyl)]acetamide is converted to N-(β-diethylaminoethyl)-α-[1-(2-carbophenoxy-6,7-dimethoxy-1,2,3,4 - tetrahydroisoquinolyl)]acetamide; N-(γ-dimethylaminopropyl)-α-[1-(6,7 - dimethoxy - 1,2,3,4 - tetrahydroisoquinolyl)]acetamide is converted to N - (γ - dimethylaminopropyl) - α - [1-(2-carbophenoxy-6,7-dimethoxy-1,2,3,4 - tetrahydroisoquinolyl)]acetamide; N-(ε-methylmercaptoamyl) - α - [1-(6,7 - dimethoxy - 1,2,3,4 - tetrahydroisoquinolyl)]acetamide is converted to N-(ε-methylmercaptoamyl)-α-[1-(2-carbophenoxy-6,7-dimethoxy - 1,2,3,4 - tetrahydroisoquinolyl)]acetamide; N-(δ-ethylmercaptobutyl)-α-[1-(6,7-dimethoxy-1,2,3,4-tetrahydroisoquinolyl)]acetamide is converted to N-(δ-ethylmercaptobutyl)-α-[1 - (2 - carbophenoxy-6,7-dimethoxy-1,2,3,4 - tetrahydroisoquinolyl)]acetamide; N-isopropylmercaptomethyl-α-[1-(6,7-dimethoxy-1,2,3,4-tetrahydroisoquinolyl)]acetamide is converted to N - isopropylmercaptomethyl - α - [1 - (2 - carbophenoxy-6,7-dimethoxy-1,2,3,4 - tetrahydroisoquinolyl)]acetamide; N-(benzoylamino)-α - [1-(6,7 - dimethoxy-1,2,3,4 - tetrahydroisoquinolyl)]acetamide is converted to N-(benzoylamino)-α-[1-(2-carbophenoxy-6,7-dimethoxy-1,2,3,4-tetrahydroisoquinolyl)]acetamide; N-(p-chlorobenzoylamino)-α-[1-(6,7-dimethoxy-1,2,3,4 - tetrahydroisoquinolyl)]acetamide is converted to N-(p-chlorobenzoylamino)-α-[1-(2-carbophenoxy-6,7-dimethoxy - 1,2,3,4 - tetrahydroisoquinolyl)]acetamide; N-(p-anisoylamino)-α-[1-(6,7-dimethoxy-1,2,3,4-tetrahydroisoquinolyl)]acetamide is converted to N-(p-anisoylamino)-α-[1-(2-carbophenoxy-6,7-dimethoxy-1,2,3,4-tetrahydroisoquinolyl)]acetamide; and N-[β-(3,4,5-trimethoxybenzoyloxy)ethyl] - α - [1-(6,7-dimethoxy-1,2,3,4-tetrahydroisoquinolyl)]acetamide is converted to N-[β-(3,4,5-trimethoxybenzoyloxy)ethyl]-α-[1-(2-carbophenoxy-6,7 - dimethoxy - 1,2,3,4 - tetrahydroisoquinolyl)]acetamide.

Similarly, N-(n-propyl)-α-[1 - (6,7 - diethoxy - 1,2,3,4-tetrahydroisoquinolyl)]acetamide is converted to N-(n-propyl)-α-[1-(2 - carbophenoxy - 6,7 - diethoxy - 1,2,3,4-tetrahydroisoquinolyl)]acetamide; N - ethyl - α - [1 - (6,7- methylenedioxy - 1,2,3,4 - tetrahydroisoquinolyl)]acetamide is converted to N-ethyl-α-[1-(2-carbophenoxy-6,7-methylenedioxy-1,2,3,4-tetrahydroisoquinolyl)]acetamide; N-methyl-α-[1-(6,7-di - n - butoxy - 1,2,3,4 - tetrahydroisoquinolyl)]acetamide is converted to N-methyl-α-[1-(2-carbophenoxy-6,7-di - n - butoxy - 1,2,3,4 - tetrahydroisoquinolyl)]acetamide; N - (β - methylmercaptoethyl) - α-[1-(6,7-di - isoamyloxy - 1,2,3,4 - tetrahydroisoquinolyl)]acetamide is converted to N-(β-methylmercaptoethyl)-α-[1-(2-carbophenoxy-6,7-di-isoamyloxy - 1,2,3,4 - tetrahydroisoquinolyl)]acetamide; N - (n-butyl)-α-[1-(6,7-dihydroxy - 1,2,3,4 - tetrahydroisoquinolyl)]acetamide is converted via its 6,7-di(3,4,5-trimethoxybenzoate) to N-(n-butyl)-α-[1-(2 - carbophenoxy - 6,7 - dihydroxy - 1,2,3,4-tetrahydroisoquinolyl)]acetamide [hydrogenolysis of the intermediate 6,7-diester is accomplished via a palladium-on-charcoal catalyst in accordance with the procedure described in the Journal of the Chemical Society, p. 3493 (1958)]; α-[1-(6,7-dimethoxy-1,2,3,4-tetrahydroisoquinolyl)acetamide is converted to α-[1-(2-carbophenoxy-6,7-dimethoxy - 1,2,3,4 - tetrahydroisoquinolyl)]acetamide; N-phenyl-α-[1-(6,7 - dimethyl - 1,2,3,4 - tetrahydroisoquinolyl)]acetamide is converted to N-phenyl-α-[1-(2-carbophenoxy-6,7 - dimethyl - 1,2,3,4 - tetrahydroisoquinolyl)]acetamide; N-(p-chlorophenyl) - α - [1 - (6,7-di - isoamyl-1,2,3,4-tetrahydroisoquinolyl)]acetamide is converted to N-(p-chlorophenyl)-α-[1 - (2 - carbophenoxy-6,7 - di - isoamyl - 1,2,3,4 - tetrahydroisoquinolyl)]acetamide; N - (p-anisyl)-α-[1-(1,2,3,4-tetrahydroisoquinolyl)]acetamide is converted to N-(p-anisyl)-α-[1-(2-carbophenoxy-1,2,3,4-tetrahydroisoquinolyl)]acetamide; N-(p-tolyl)-α - [1 - (6-hydroxy-7-methyl - 1,2,3,4 - tetrahydroisoquinolyl)]acetamide is converted via its 6-acetate to N-(p-tolyl)-α-[1-(2-carbophenoxy-6-hydroxy-7-methyl-1,2,3,4 - tetrahydroisoquinolyl)]acetamide; and N-(n-butyl)-α-[1-(6-ethoxy-7-methoxy-1,2,3,4-tetrahydroisoquinolyl)]acetamide is converted to N-(n-butyl)-α-[1-(2-carbophenoxy-6-ethoxy-7-methoxy-1,2,3,4-tetrahydroisoquinolyl)]acetamide.

*Example VI*

In a 200 ml. three-necked, round-bottomed flask fitted with mercury-sealed stirrer and reflux condenser, there were placed 0.50 g. (0.00108 mole) of N-benzyl-α-[1-(2-carbophenoxy-6,7-dimethoxy - 1,2,3,4 - tetrahydroisoquinolyl)]acetamide and 0.043 g. (0.00110 mole) of sodamide in 50 ml. of dry toluene. Stirring was commenced and the resulting solution was refluxed for four hours. At the end of this period, the reaction mixture was cooled to room temperature and 50 ml. of water was rapidly added with constant agitation being maintained throughout the addition step. The toluene layer was then separated from the aqueous layer, washed with one 50 ml. portion of water and dried over anhydrous sodium sulfate. After removal of the drying agent by means of filtration and concentration of the resulting filtrate under reduced pressure, there was obtained a residual cloudy-white oil which crystallized as a light yellow semi-solid on subsequent cooling. Recrystallization of the latter material from ethanol in the presence of charcoal afforded 0.87 g. (22%) of 2,4-dioxo-3-benzylaza-9,10-dimethoxy-1,2,3,4,6,7 - hexahydro - 11b-H-benzopyridocoline in the form of white crystals melting at 171.5–172° C.

*Analysis.*—Calcd. for $C_{21}H_{22}N_2O_4$: C, 68.83; H, 6.05; N, 7.65. Found: C, 68.61; H, 6.10; N, 7.79.

*Example VII*

The procedure described in Example VI is followed except that N - (p-chlorobenzyl)-α-[1-(2-carbophenoxy-6,7 - dimethoxy-1,2,3,4-tetrahydroisoquinolyl)]-acetamide is the starting material employed in lieu of the corresponding N-benzyl compound of the previous example; in this particular case, the corresponding product obtained is 2,4 - dioxo-3-(p-chlorobenzyl)aza-9,10-dimethoxy-1,2,3,4,6,7 - hexahydro-11b-H-benzopyridocoline. In the same manner and employing appropriate amounts of starting material and reagent in each case, N - (β-phenylethyl)-α-[1-(2-carbophenoxy-6,7-dimethoxy-1,2,3,4-tetrahydroisoquinolyl)]acetamide is converted to 2,4-dioxo-3-(β-phenylethyl)aza-9,10-dimethoxy-1,2,3,4,6,7-hexahydro-11b-H-benzopyridocoline;

N - (m-xylyl)-α-[1-(2-carbophenoxy-6,7-dimethoxy-1,2,3,4-tetrahydroisoquinolyl)]acetamide is converted to 2,4 - dioxo-3-(m-xylyl)aza-9,10-dimethoxy-1,2,3,4,6,7-hexahydro-11b-H-benzopyridocoline;

N - (p-chlorobenzohydryl)-α-[1-(2-carbophenoxy - 6,7-dimethoxy - 1,2,3,4 - tetrahydroisoquinolyl)]acetamide is converted to 2,4-dioxo-3-(p-chlorobenzohydryl)aza-9,10 - dimethoxy-1,2,3,4,6,7-hexahydro-11b-H-benzopyridocoline;

N-(n-butyl)-α-[1-(2-carbophenoxy-6,7-dimethoxy- 1,2,3,4-tetrahydroisoquinolyl)]acetamide is converted to 2,4-dioxo-3-(n-butyl)aza-9,10-dimethoxy-1,2,3,4,6,7 - hexahydro-11b-H-benzopyridocoline;

N - isobutyl-α-[1-(2-carbophenoxy-6,7-dimethoxy-1,2,3,4-tetrahydroisoquinolyl)]acetamide is converted to 2,4-dioxo - 3 - isobutylaza-9,10-dimethoxy-1,2,3,4,6,7-hexahydro-11b-H-benzopyridocoline;

N - isoamyl-α-[1-(2-carbophenoxy-6,7-dimethoxy-1,2,3,4-tetrahydroisoquinolyl)]acetamide is converted to 2,4-dioxo-3-isoamylaza-9,10-dimethoxy - 1,2,3,4,6,7-hexahydro-11b-H-benzopyridocoline;

N - (β - hydroxyethyl)-α-[1-(2-carbophenoxy-6,7-dimethoxy - 1,2,3,4-tetrahydroisoquinolyl)]acetamide is converted via its acetate to 2,4-dioxo-3-(β-hydroxyethyl)-aza - 9,10-dimethoxy-1,2,3,4,6,7-hexahydro-11b-H-benzopyridocoline; and N - (γ-hydroxypropyl)-α-[1-(2 - carbophenoxy - 6,7,-dimethoxy-1,2,3,4-tetrahyhydroisoquinolyl)]acetamide is converted via its acetate to 2,4-dioxo-3-(γ-hydroxypropyl)aza - 9,10-dimethoxy-1,2,3,4,6,7-hexahydro-11b-H-benzopyridocoline.

In like manner and employing appropriate molar amounts of reactants in each case, N - (β-methoxyethyl)-α-[1-(2-carbophenoxy-6,7-dimethoxy-1,2,3,4 - tetrahydroisoquinolyl)]acetamide is converted to 2,4-dioxo-3-(β-methoxyethyl)aza-9,10-dimethoxy-1,2,3,4,6,7-hexahydro-11b-H-benzopyridocoline;

N - (γ-methoxypropyl)-α-[1-(2-carbophenoxy-6,7-dimethoxy - 1,2,3,4-tetrahydroisoquinolyl)]acetamide is converted to 2,4 - dioxo-3-(γ-methoxypropyl)aza-9,10-dimethoxy - 1,2,3,4,6,7-hexahydro-11b-H-benzopyridocoline;

N - (γ - isopropoxypropyl)-α-[1-(2-carbophenoxy-6,7-dimethoxy - 1,2,3,4 - tetrahydroisoquinolyl)]acetamide is converted to 2,4-dioxo-3-(γ-isopropoxypropyl)aza - 9,-10 - dimethoxy-1,2,3,4,6,7-hexahydro-11b-H-benzopyridocoline;

N - allyl-α-[1-(2-carbophenoxy-6,7-dimethoxy - 1,2,3,4-tetrahydroisoquinolyl)]acetamide is converted to 2,4-dioxo-3-allylaza - 9,10 - dimethoxy-1,2,3,4,6,7-hexahydro-1b-H-benzopyridocoline;

N - (β-methylallyl)-α-[1-(2-carbophenoxy-6,7-dimethoxy-1,2,3,4-tetrahydroisoquinolyl)]acetamide is converted to 2,4 - dioxo - 3 - (β-methylallyl)aza-9,10-dimethoxy-1,2,3,4,6,7-hexahydro-11b-H-benzopyridocoline;

N-(β-diethylaminoethyl)-α-[1-(2-carbophenoxy - 6,7 - dimethoxy - 1,2,3,4-tetrahydroisoquinolyl)]acetamine is converted to 2,4-dioxo - 3 - (β-diethylaminoethyl)aza-9,10 - dimethoxy - 1,2,3,4,6,7-hexahydro-11b-H-benzopyridocoline;

N - (γ-dimethylaminopropyl)-α-[1-(2-carbophenoxy-6,7-dimethoxy-1,2,3,4-tetrahydroisoquinolyl)]acetamide is converted to 2,4-dioxo-3-(γ-dimethylaminopropyl)aza-9,10-dimethoxy-1,2,3,4,6,7 - hexahydro - 11b-H-benzopyridocoline;

N - (ε-methylmercaptoamyl)-α-[1-(2-carbophenoxy-6,7-dimethoxy-1,2,3,4-tetrahydroisoquinolyl)]acetamide is converted to 2,4-dioxo-3-(ε-methylmercaptoamyl)aza-9,10 - dimethoxy - 1,2,3,4,6,7-hexahydro-11b-H-benzopyridocoline;

N - (δ - ethylmercaptobutyl)-α-[1-(2-carbophenoxy-6,7-dimethoxy - 1,2,3,4 - tetrahydroisoquinolyl)]acetamide is converted to 2,4-dioxo-2-(δ-ethylmercaptobutyl)aza-9,10 - dimethoxy - 1,2,3,4,6,7-hexahydro-11b-H-benzopyridocoline;

N - isopropylmercaptomethyl-α-[1-(2-carbophenoxy-6,7-dimethoxy-1,2,3,4,-tetrahydroisoquinolyl)]acetamide is converted to 2,4-dioxo-3-isopropylmercaptomethylaza-9,10 - dimethoxy - 1,2,3,4,6,7-hexahydro-11b-H-benzopyridocoline;

N-(benzoylamino)-α-[1-( 2-carbophenoxy-6,7-dimethoxy-1,2,3,4-tetrahydroisoquinolyl)]acetamide is converted to 2,4-dioxo - 3 - (benzoylamino)aza-9,10-dimethoxy-1,2,3,4,6,7-hexahydro-11b-H-benzopyridocoline;

N - (p-chlorobenzoylamino)-α-[1-(2-carbophenoxy-6,7-dimethoxy-1,2,3,4-tetrahydroisoquinolyl)]acetamide is converted to 2,4-dioxo-3-(p - chlorobenzoylamino)aza-9,10-dimethoxy-1,2,3,4,6,7-hexahydro-11b-H-benzopyridocoline;

N - (p-anisoylamino)-α-[1-(2-carbophenoxy-6,7-dimethoxy - 1,2,3,4-tetrahydroisoquinolyl)]acetamide is converted to 2,4 - dioxo - 3 - (p-anisoylamino)aza-9,10-dimethoxy - 1,2,3,4,6,7-hexahydro-11b-H-benzopyridocoline; and N-[β-(3,4,5 - trimethoxybenzoyloxy)ethyl]-α-[1-(2-carbophenoxy - 6,7-dimethoxy-1,2,3,4 - tetrahydroisoquinolyl)]acetamide is converted to 2,4-dioxo-3-[β-(3,4,5-trimethoxybenzoyloxy)ethyl]aza - 9,10 - dimethoxy-1,2,3,4,6,7-hexahydro-11b-H-benzopyridocoline. Similarly, N-(n-propyl)-α-[1-(2-carbophenoxy-6,7-diethoxy-1,2,3,4-tetrahydroisoquinolyl)]acetamide is converted to 2,4-dioxo-3-(n-propyl)aza-9,10-diethoxy - 1,2,3,4,6,7-hexahydro-11b-H-benzopyridocoline;

N - ethyl - α - [1-(2-carbophenoxy - 6,7-methylenedioxy-1,2,3,4-tetrahydroisoquinolyl)]acetamide is converted to 2,4-dioxo-3-ethylaza-9,10-methylenedioxy-1,2,3,4,6,7-hexahydro-11b-H-benzopyridocoline;

N - methyl-α-[1-(2-carbophenoxy-6,7-di-n-butoxy-1,2,3,4-tetrahydroisoquinolyl)]acetamide is converted to 2,4-dioxo-3-methylaza-9,10-di-n-butoxy - 1,2,3,4,6,7 - hexahydro-11b-H-benzopyridocoline;

N - (β - methylmercaptoethyl)-α-[1-(2-carbophenoxy-6,7-di-isoamyloxy - 1,2,3,4 - tetrahydroisoquinolyl)]acetamide is converted to 2,4-dioxo-3-(β-methylmercaptoethyl)aza - 9,10 - di-isoamyloxy-1,2,3,4,6,7-hexahydro-11b-H-benzopyridocoline;

N-(n-butyl)-α-[1-(2-carbophenoxy-6,7-dihydroxy- 1,2,3,4-tetrahydroisoquinolyl)]acetamide is converted via its 6,7-di(3,4,5-trimethoxybenzoate) to 2,4 - dioxo-3-(n-butyl)aza-9,10-dihydroxy-1,2,3,4,6,7 - hexahydro - 11b-H-benzopyridocoline;

α-[1-(2-carbophenoxy-6,7-dimethoxy-1,2,3,4 - tetrahydroisoquinolyl)]acetamide is converted to 2,4 - dioxo-3-aza-9,10-dimethoxy - 1,2,3,4,6,7-hexahydro-11b-H-benzopyridocoline;

N - phenyl-α-[1-(2-carbophenoxy-6,7 - dimethyl - 1,2,3,4-tetrahydroisoquinolyl)]acetamide is converted to 2,4-dioxo-3-phenylaza-9,10-dimethyl-1,2,3,4,6,7-hexahydro-11b-H-benzopyridocoline;

N - (p-chlorophenyl)-α-[1-(2-carbophenoxy - 6,7-(di-isoamyl-1,2,3,4-tetrahydroisoquinolyl)]acetamide is converted to 2,4 - dioxo-3-(p-chlorophenyl)aza-9,10-di-isoamyl-1,2,3,4,6,7-hexahydro-11b-H-benzopyridocoline;

N - (p-anisyl)-α-[1-(2-carbophenoxy-1,2,3,4 - tetrahydroisoquinolyl)]acetamide is converted to 2,4-dioxo-3-(p-anisyl)aza - 1,2,3,4,6,7-hexahydro-11b-H-benzopyridocoline;

N - (p-tolyl)-α-[1-(2-carbophenoxy-6-hydroxy-7-methyl-1,2,3,4-tetrahydroisoquinolyl)]acetamide is converted via its 6-acetate to 2,4-dioxo-3-(p-tolyl)aza-9-hydroxy-10-methyl-1,2,3,4,6,7 - hexahydro-11b-H-benzopyridocoline; and N - (n-butyl)-α-[1-(2-carbophenoxy-6-ethoxy-7-methoxy-1,2,3,4-tetrahydroisoquinolyl)]acetamide is converted to 2,4-dioxo-3-(n-butyl)aza-9-ethoxy-10-methoxy-1,2,-3,4,6,7-hexahydro-11b-H-benzopyridocoline.

Example VIII 2,4 - dioxo - 3-[β-(3,4,5-trimethoxybenzoyloxy)ethyl]-aza-9,10-dimethoxy-1,2,3,4,6,7 - hexahydro-11b-H-benzopyridocoline was prepared by treating the corresponding non-acylated azabenzopyridocoline in chloroform with 3,4,5-trimethoxybenzoyl chloride at room temperature for about 15 minutes; this product proved to be identical with that described in Example V as attested to by melting point and mixed point determinations.

In the same manner, treatment of each of the other hydroxyalkylazabenzopyridocolines described in the previous examples with 3,4,5-trimethoxybenzoyl chloride affords the corresponding 3,4,5-trimethoxybenzoyl esters. Moreover, other hydrocarbon carboxylic acid esters of hydroxyalkylazabenzopyridocoline derivatives have also been prepared by this same procedure by employing the appropriate acyl chloride in each case; such other esters which have been specifically obtained in this manner include the acetate, propionate, valerate, caproate, benzoate, p-chlorobenzoate, phenylacetate, 2-thenoate and 2-furoate. For instance, 2,4-dioxo-3-(β-hydroxyethyl)-aza - 9,10 - dimethoxy-1,2,3,4,6,7-hexahydro-11b-H-benzopyridocoline and acetyl chloride react to afford the corresponding acetate, while 2,4-dioxo-3-(γ-hydroxypropyl)aza-9,10 - dimethoxy - 1,2,3,4,6,7 - hexahydro-11b-H-benzopyridocoline and benzoyl chloride react to afford the corresponding benzoate.

Example IX

A dry solid pharmaceutical composition was prepared by blending the following materials in the proportions by weight specified:

2,4-dioxo-3-(n-butyl)aza-9,10-dimethoxy - 1,2,3,4,6,7-
 hexahydro-11b-H-benzopyridocoline _____ 10
Dicalcium phosphate _____ 45
Potato starch _____ 20
Lactose _____ 15
Polyvinylpyrrolidone _____ 8
Magnesium stearate _____ 2

After the dried composition was thoroughly blended, tablets were punched from the resulting mixture, each tablet being of such size that it contained 50 mg. of the active ingredient.

Example X

A dry solid pharmaceutical composition was prepared by combining the following materials in the proportions by weight specified:

2,4-dioxo-3-(isobutyl)aza-9,10-dimethoxy - 1,2,3,4,6,7-
 hexahydro-11b-H-benzopyridocoline _____ 10
Polyethylene glycol (average molecular weight,
 4000) _____ 30
Lactose _____ 40
Calcium carbonate _____ 20

The dried solid mixture so prepared was thoroughly agitated so as to obtain a powdered product which was completely uniform. Soft elastic and hard shelled gelatin capsules containing this pharmaceutical composition were then prepared, employing a sufficient quantity of material so as to furnish 250 mg. of the active ingredient in each capsule.

Example XI

An aqueous propylene glycol solution containing 2,4-dioxo-3-(γ-hydroxypropyl)aza-9,10-dimethoxy - 1,2,3,4,6,7-hexahydro-11b-H-benzopyridocoline was prepared by dissolving the latter compound in propylene glycol-water (9:1 by weight) with the aid of gentle heating. The amount of compound employed was such that the resulting solution contained 5 mg. of the active ingredient per ml. After cooling to room temperature, it was sterilized by means of filtration through a Seitz filter. The sterile aqueous propylene glycol solution so obtained was suitable for intramuscular administration to animals.

What is claimed is:
1. 2,4-dioxo-3-aralkylaza-9,10-di(lower alkoxy)-1,2,3,4,6,7-hexahydro-11b-H-benzopyridocoline, wherein the aralkyl nucleus is selected from the group consisting of benzyl, p-chlorobenzyl, β-phenylethyl, m-xylyl and p-chlorobenzohydryl.
2. 2,4-dioxo-3-benzylaza-9,10-dimethoxy-1,2,3,4,6,7-hexahydro-11b-H-benzopyridocoline.
3. 2,4-dioxo-3-(p-chlorobenzyl)aza-9,10-dimethoxy-1,2,3,4,6,7-hexahydro-11b-H-benzopyridocoline.
4. 2,4-dioxo-3-(β-phenylethyl)aza-9,10-dimethoxy-1,2,3,4,6,7-hexahydro-11b-H-benzopyridocoline.

References Cited in the file of this patent

UNITED STATES PATENTS

| | | |
|---|---|---|
| 2,854,379 | Fancher | Sept. 30, 1958 |
| 2,872,374 | Beiler et al. | Feb. 3, 1959 |
| 2,987,516 | Holysz et al. | June 6, 1961 |
| 2,998,421 | Doub et al. | Aug. 29, 1961 |

OTHER REFERENCES

Elderfield: Heterocyclic Compounds, 5 (New York, 1957), page 261.

Yamazaki: Yakugaku Zasshi, volume 79, pages 1008–1013, August 1959.